Feb. 2, 1943.  C. D. PRATT  2,309,978
PROPELLENT FUEL ASSEMBLY
Filed June 21, 1940
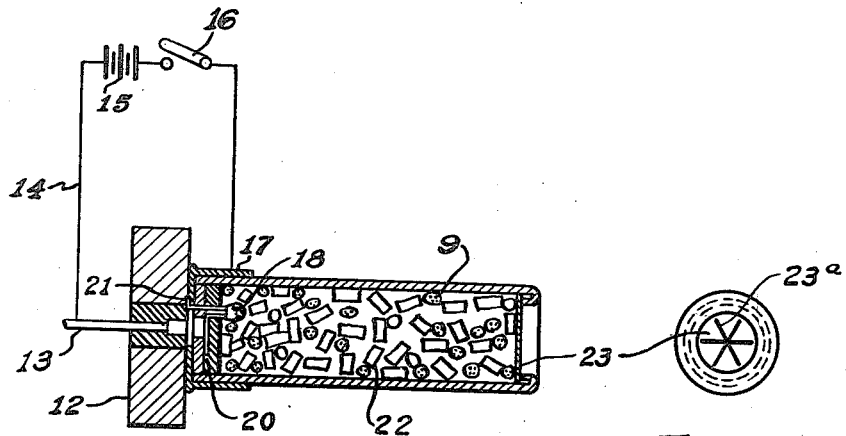
Fig. 1.
Fig. 2.
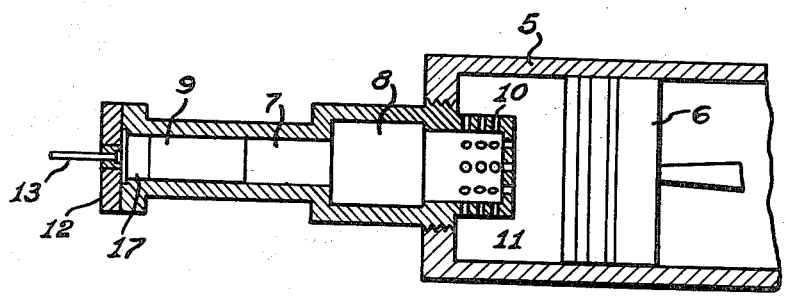
Fig. 3.
CARL D. PRATT,
INVENTOR
BY
ATTORNEY Patented Feb. 2, 1943

2,309,978

UNITED STATES PATENT OFFICE 2,309,978

PROPELLENT FUEL ASSEMBLY

Carl D. Pratt, Tamaqua, Pa., assignor to Atlas Powder Company, Wilmington, Del., a corporation of Delaware Application June 21, 1940, Serial No. 341,666

18 Claims. (Cl. 102—39)

This invention relates to new and useful improvements in substantially solid propellent fuel cartridges and more particularly those used as the source of power for the operation of prime-movers, as for example: internal combustion engines, motor-starters, switch-closers, etc. This application is a continuation-in-part of my application Serial Number 647,268, filed December 14, 1932.

In cases where the propellent fuel charges are so poorly inflammable (for example grains of colloided nitrocellulose) that they cannot be dependably, directly initiated by primary heat producing elements, as percussion caps, electrically heated bridge-wires, electric sparks, etc., it is customary to employ an intermediary charge of a more inflammable, fast burning, high pressure producing substance as ordinary black gun-powder and the like, between the primary heat producing element and the main fuel charge; one object being to ignite the entire fuel charge as quickly as possible. Another important object was to have the auxiliary or intermediate ignition charge develop sufficient pressure to not only add to the pressure developed by the main fuel charge, during the inertia-overcoming period, but also to accelerate the burning speed of the main fuel charge by means of the increased pressure, during this same period; thus reducing the time required to overcome the inertia of the movable element and put it in motion. Propellent fuel cartridges, embodying the above conventional types of ignition media have been proposed and used for the actuation of various types of prime-movers, of which proposals I am fully aware.

The resulting initial jolt or sudden surge of pressure against the movable element or elements of a prime-mover, caused by a cartridge of this type, is quite objectionable, however. A reduction of this sudden initial shock has heretofore been effected by means of a shock absorbing space between the fuel charge (cartridge) and the movable element (piston), but only to a limited degree. Such a space effectively retards the rate of development of the pressure resulting from the burning fuel, but fails to entirely eliminate the initial jolt against the piston that is peculiar to all types of fuel cartridges heretofore adapted in this manner. This defect is manifested to a marked degree in a prime-mover of the type whose pressure receiving element moves some distance before engaging the main load of inertia, as, for example, a motor starter, the piston of which moves forward and engages a clutch attached to a motor. In such a case, the inertia of the piston, before it engages the clutch of the motor, is small enough to be quickly overcome; the piston being thrown violently against the clutch with a considerable and often damaging force of impact, that is very objectionable.

In my co-pending application Serial Number 647,268, filed December 14, 1932, there is broadly described means whereby this problem may be solved and the initial sudden surge of pressure against the movable element or elements of a prime-mover, actuated by an essentially solid propellent fuel charge, may be practically eliminated. In accordance with the disclosure of the said application, the control of the pressure development of the auxiliary or intermediary fuel kindling element is essential. This is effectively accomplished through the use of an intermediary fuel kindling element consisting of an inflammable, deflagrating composition of such nature and in such amount that it dependably ignites the propellent fuel but develops gas in such small amounts and/or in such gradual manner that the normal amount and rate of pressure development of the ignited fuel is not appreciably increased thereby. By the use of this element of control, in fuel cartridges that are adaptable for the actuation of a prime-mover, I find an advantageous difference to exist in the characteristics of operation of the prime-mover, as compared with similar cartridges embodying high pressure producing ignition media. For example, the peak pressure exerted against the movable element (piston) before it starts to move is materially lowered; the low pressure producing fuel-kindling element adding an inappreciable amount of pressure to the system, thereby avoiding an appreciably increased or abnormally high burning speed of the main fuel charge, during the time period required for the overcoming of the inertia of the movable element or elements, it being inherent in propellent fuels that their speeds of burning increase with increase of pressure. Because of this advantageous effect, I find the strain on the mechanical structure of the prime-mover to be minimized to the extent that lighter, weaker, and less cumbersome structures may be employed than were otherwise required, this being of especial importance in airplane engine starters. I also find that a greater flexibility as to the volume of shock-absorbing space between fuel and movable pressure receiving element is afforded; smaller volumes being suitable, resulting in greater power-efficiencies for given fuel charges.

In the accompanying drawing:

Fig. 1 is a diagrammatic sectional view of a cartridge and ignition system hereinafter described. Fig. 2 is an end view of said cartridge and Fig. 3 is a sectional view through a prime mover and associated cartridge receiving breech mechanism and expansion chamber.

Like numerals designate corresponding parts in both the figures of the drawing.

In the drawing, 5 designates a cylinder in which a prime mover such as the piston 6 is mounted to travel. A cartridge receiving compartment 7 is connected to the cylinder 5 by a suitable conduit 8 constituting a closed pathway by which the products of combustion from the propulsive cartridge 9 are conducted to the cylinder 5. The interior of the conduit 8 is preferably separated from the interior of the cylinder 5 by means of a suitable screen 10 of any desired form which prevents any of the main charge blown from the cartridge from being blown directly into the cylinder 5 where it might accumulate, if extinguished, and be fired with successive charges and thereby produce undesirably great pressure in said cylinder. The capacity of the conduit 8 and the expansion space 11 within the cylinder 5 are at least equal to and preferably greater than the volume of the fuel in cartridge 9, so that the volume thus provided for the expansion of the gases evolved from the cartridge 9 permits the building up of the pressure in cylinder 5 so gradually that the prime mover 6 may be started into action relatively gently and without undue shock. Also the inertia of the prime mover may be gently overcome and where, as in engine starters, the initial forward movement of the piston brings clutch parts together, such clutch parts are caused to engage relatively gently and before the application of starting torque actually begins.

The cartridge 9 is backed up by a breech block 12 through which a contact pin 13 is mounted to move. This contact pin constitutes a part of an electric circuit consisting of a conductor 14, battery 15, switch 16 and the metallic ferrule 17 of the cartridge. The physical embodiment of the invention which I have chosen for purposes of illustration is an electric match comprising a preformed fuse head of hot flash composition, indicated at 18, which is formed upon a bridge wire connected across the metallic strips 20, 21. This flash composition is set off when the contact pin 13 contacts with one of the metallic strips 20, constituting one of the terminals of the match head; the other terminal of the match head being grounded at 21 upon the metallic ferrule 17. When a circuit is completed as described, the hot flash composition is ignited and delivers such a large volume of sustained flame, without concussion or detonation, as serves to locally ignite the body of main fuel, indicated at 22. This fuel comprises a multiplicity of pellets of the character hereinbefore described, such, for example, as pellets of smokeless powder some of which have only three perforations formed therethrough while others have five; it being apparent that by varying the composition and by eliminating or changing the number of perforations and consequently the effective or exposed area of the pellets, I am able to so control the rates of burning of the several pellets as to get the desired degree of progressive burning of the main fuel charge, as a whole. A wad or cap 23 which may be of a nitrocellulose film serves to hold the main fuel charge in place but at the same time is so easily ruptured and fored out of the end of the shell that no appreciable pressure is built up within the shell before this film 23 lets go. Or I may weaken cap 23 by scoring or slitting the same as indicated at 23a. Consequently, the fuel of the main charge is not blown from the cartridge into the conduit 8 with such suddenness and violence as would be likely to extinguish it or blow it out. However, in order to further safeguard against this blowing out or extinguishment of the main charge, I may incorporate in the cartridge a limited amount of a combustion sustaining element such as nitroglycerine, or an oxygen delivering salt such as an alkali nitrate incorporated in the fuel grains as suggested in my co-pending application Ser. No. 633,215, filed September 14, 1932.

The invention of the present application relates broadly to prime-mover actuating cartridges of the type exemplified in the appended drawing and described above.

And, in particular, the present application is directed toward certain new and improved, auxiliary or intermediate, fuel kindling elements thereof, namely; those comprising a substantial proportion of zirconium and a suitable admixed oxygen supplier compound, such as, for example, lead peroxide and the like.

I have found by experimental tests that the fuel kindling elements of the present invention fall within the broad classification, disclosed and defined in my co-pending application Ser. No. 647,268, of which this is a continuation-in-part; in that they are inflammable, non-shock-producing intermediate, kindling compositions for the dependable ignition of the fuel charge in a propellent fuel cartridge for the actuation of prime-movers, while developing gaseous products of combustion in such small amounts and/or in such gradual manner that the normal amount and rate of pressure development of the propellent fuel charge associated therewith is not appreciably increased thereby, under the conditions of use. Two of the factors, which are believed to contribute to placing the kindling elements of this invention within this classification are: (1) their high flame temperatures and (2) their relatively small amounts of gaseous products of combustion.

In addition, I have also found these fuel kindling elements of the present invention to have certain unusual and outstanding advantages for the purpose intended.

For example, it has been difficult to find a suitable composition, within the scope of the broad classification previously mentioned, that will retain its prompt and dependable fuel kindling action after prolonged storage in warm, humid and acid atmospheres, as for example in the tropics in contact with propellent fuels (such as colloided nitrocellulose) that yield acids oxides of nitrogen as normal, gradual decomposition products. I have found kindling elements of the present invention to be superior in this respect.

It has also been difficult to find an ingredient or combination of ingredients for such a fuel kindling element that is not only readily and reliably ignitable from a primary heat producing element, as for example a low voltage electrically heated bridge wire in contact therewith, but also at the same time sufficiently hot and slow burning as to directly and dependably ignite the relatively large grains of difficultly ignitable propellent fuels, as for example colloidal nitrocellulose, that are used in cartridges of the prime-mover actuating type described herein. I have found kindling elements of the present invention to have this unusual characteristic, also. This characteristic has been found desirable from such standpoints as structural simplicity and functioning reliability, as will hereinafter be more thoroughly described.

Now, in accordance with my present invention, I provide, in the said type of prime-mover actuating fuel cartridge, an inflammable, non-shock producing, intermediate fuel kindling element comprising zirconium and an oxygen supplier compound as mixed ingredients. By the term "oxygen supplier compound" I mean any solid compound, comprising oxygen, that is capable of being mixed with comminuted zirconium and of yielding at least a portion of its oxygen for the oxidation of the said zirconium when heated to or above the ignition temperature of the said mixture.

In selecting an oxygen supplier compound for my purpose, I may choose from a large variety of suitable compounds since zirconium, when sufficiently heated, is capable of taking the oxygen required for its combustion from many oxygen-bearing compounds, even though they in themselves do not contain easily liberated oxygen.

Examples of oxygen supplier compounds which I have found suitable are: metallic oxides, as $PbO_2$, $BaO_2$, $MnO_2$, etc.; metallic nitrates as $Pb(NO_3)_2$, $Ba(NO_3)_2$, etc.; metallic chromates and bichromates, as $K_2Cr_2O_7$, $K_2CrO_4$, etc.; chlorates and perchlorates, as $KClO_3$, $NH_4ClO_4$, etc.

My choice of a suitable oxygen supplier compound is largely governed, however, by the combination of characteristics desired, as for example, compatibility with respect to the primary heat producing element employed, moisture-resistance, corrosiveness on the materials with which it or its products of combustion come in contact, etc. In this connection, I find it usually preferable for use in the kindling elements of the present invention to employ a compound that is not easily affected by moisture and is substantially chlorine-free, although the scope of my invention is not limited thereto.

As for the proper proportion of oxygen supplier compound to zirconium to be employed in the kindling elements of my present invention, I find that it varies not only with the flame characteristics desired but also with the relative reaction speeds of the various compounds; the degree of fineness of the ingredients also being a factor.

For example, 90% zirconium powder, when intimately mixed with 10% of each of the following oxygen supplier compounds, yield burning speeds, in approximately the following order—

1. $K_2Cr_2O_7$
2. $Pb(NO_3)_2$
3. $Ba(NO_3)_2$    Vigorous
4. $PbO_2$    to
5. $K_2CrO_4$    sluggish
6. $PbCrO_4$
7. $BaO_2$ And experiments have indicated that up to about 90% of the moreسsluggish types, as for example $BaO_2$ may be used with 10% zirconium to produce suitable flash characteristics, whereas considerably less of the more active compounds should be used. For example, a 50-50 mixture of $PbO_2$ and zirconium reacts with almost explosive violence; necessitating the use of not more than about 25% $PbO_2$ for my purpose.

Specific examples of preferred, suitable kindling compositions, in accordance with my present invention, are:

1. Zirconium 75 to 95%, lead peroxide 25 to 5%
2. Zirconium 65 to 85%, lead chromate 35 to 15%
3. Zirconium 70 to 90%, lead nitrate 30 to 10%
4. Zirconium 70 to 90%, barium nitrate 30 to 10%

Of the above examples, Nos. 1 and 2 are preferable from the standpoint of particularly good storage life in contact with warm, humid and/or acid atmospheres, such as might be experienced, for example, in contact with colloided nitrocellulose fuels in the tropics.

In the selection of a primary heat producing element for use in the above described type of propellent fuel cartridge to ignite the novel intermediary, kindling element, of the present invention there is a wide field from which to choose, comprising such media as percussion caps, friction match compositions, electric spark gaps, electrically heated bridge wires, etc. The method of construction of my novel igniting element may accordingly vary over a wide range, depending on the style of primary heat producing element employed and the adaptation required for the style cartridge in which it is to be embodied. I may, for example, employ my novel, slow burning, kindling element in combination with a percussion cap composition adapted to ignite from a sharp blow (as from a firing pin) and thereby transmit ignition to the said kindling element, which in turn gradually ignites the main fuel charge, without sudden shock to the movable element of the prime-mover, especially when used in combination with means for allowing the free flow of pressure from the cartridge from the moment that the propellent fuel charge therein is ignited, as disclosed in my co-pending application Serial Number 647,267, filed December 14, 1932. I may also substitute for the percussion cap composition, one of various other primary heat-producing media, the function of which is merely to ignite my novel, kindling element with a minimum amount of pressure development.

Of the various types of primary heat producing elements available, I prefer those utilizing electrical energy, as for example, electrically heated bridge wires and spark gaps. Reasons for this preference are exemplified, as follows:

1. Electrically fired cartridges are relatively safe from premature and accidental discharge from shock or friction during handling.
2. Electric heat entails little or no gas development and therefore helps to reduce the pressure during the fuel ignition period.
3. The less corrosive types of kindling composition may be easier adapted for use; it being difficult, for example, to find a satisfactory chlorine-free percussion cap composition.
4. Electrically fired cartridges permit greater flexibility of use, as for example in remote firing, automatic firing, simultaneous firing of more than one, etc.
5. Greater flexibility as to the position of the igniting element and the multiplicity of ignition elements in the cartridge, is afforded.

There are available two general methods of employing electrical initiation for my novel type of cartridge ignition medium. One type involves the use of the kindling composition in loose form, in which is imbedded, for example, a fine bridge-wire, which is usually fastened to conductors by soldering, crimping or welding. The other type involves a preformed match or fuse head in which the kindling composition is pressed, molded, cemented or otherwise formed around the bridge-wire (or spark gap) prior to the insertion of the same into the assembly. Although it would be quite possible to apply the first type of primer to fuel cartridge assemblies, it would be much less desirable than the second or pre-formed match or fuse head type. For example, it would be possible to place a loose charge around a bridge-wire, in the base of the cartridge and hold it in place by means of an inflammable wad, separating the primer charge from the main fuel charge. This type of assembly is quite inferior, for my purpose, however, to a pre-formed electric match or fuse head, which permits the use of a minimum amount of kindling composition, a greater flexibility as to the position of the primer in the cartridge, a more direct contact with the fuel charge and the possibility of almost completely surrounding it with the fuel charge, if desired. In fact, the above recited advantages of an electrically initiated preformed fuse head permit the obtaining of dependable ignition of propellent fuels, of the type adaptable for the actuation of a prime-mover, with such small amounts of kindling composition that the gas evolution and speed of burning thereof may be practically eliminated from consideration, insofar as the ill effects on the system pressure during the inertia overcoming period is concerned.

It should be understood that I do not limit myself to a preformed electric match or fuse head nor any particular design thereof, employed in a fuel cartridge, but I prefer to use a conventional, electric match head type, a well known example of which consists of two metal strips, separated by electrical insulation but held rigid by a clamp and joined at one end by a bridge wire.

In the fabrication of this preferred type of ignition medium, I find it usually to be of advantage to employ a small amount of highly inflammable flash composition in direct contact with the primary electrical heat producing element (bridge-wire or spark gap), which takes ignition therefrom and transmits ignition to the fuel kindling composition of the present invention. Examples of suitable compositions for this purpose are as follows:

(1) Cuprous acetylide.
(2) Lead picrate.
(3) Lead peroxide and zirconium powder mixture.
(4) A mixture of (1) and (3) in equal quantities by weight.

The above type of flash composition is preferably molded, with the aid of a binder as nitrocellulose lacquer for example, around the bridge wire or spark gap. Over this composition is then formed the layer of my novel intermediary kindling composition, comprising zirconium, in similar manner. After drying, one or more lacquer films may be applied to impart moisture resistance and mechanical strength.

From the above, it will be noted that both the inner and outer molded layers of flash composition, used in fabricating my preferred electric match form of ignition medium, may comprise lead peroxide and zirconium powder mixture. These ingredients may be in the same or different proportions for the two layers or I may employ a single, continuous body of such a mixture, for my purpose, instead of two or more layers.

By means of the present invention, I am accordingly able to eliminate the use of such conventional, sensitive ingredients as cuprous acetylide, lead picrate and the like, in contact with the bridge wire, if so desired, since I have discovered that zirconium flash compositions of the present invention may be utilized for both purposes, namely: (1) to take ignition from the electrically heated bridge wire and (2) to ignite the relatively large grains of difficultly ignitable propellent fuels (as colloided nitrocellulose). I am thereby enabled to employ the same flash composition or at least the same combination of ingredients for both purposes; thereby eliminating the possibility of combinations of flash compositions that may be chemically incompatible under prolonged humid storage in contact with each other, as well as the necessity of employing separating films, such as lacquer, to protect one from the other.

Further, when employed in the preferred form of an electric match, the speed of burning and flame characteristics of the fuel kindling element must be but slightly affected by variation of confinement, such as may occur, for example by the normal variations in the thickness and strength of the lacquer skin coatings that are employed thereover for the purpose of protection and added physical strength. The kindling element of the present invention has been found to possess this very desirable characteristic also, in that it is effected to an unusually low degree by such variations in confinement.

Still other additional advantages have been found for the kindling elements of the present invention, namely: those comprising zirconium and an oxygen supplier compound such as lead peroxide and the like. For example, I have found them to possess a persistent after-glow of appreciable duration, which is not easily extinguished; thereby adding greatly to their reliability for the ignition or kindling of the fuel charges employed therewith. I also have found that the proportions of zirconium and oxygen supplier compound may be varied, with respect to each other, over considerable range, to produce variations in characteristics as desired. For example, when employing the combination of zirconium and lead peroxide (alone except for a nitrocellulose lacquer vehicle as a binder), I find that I may increase the sensitivity to ignition by heat by using a relatively large amount of lead peroxide—say 20-30%, under which conditions there is more or less tendency for the burning (or glowing) composition to be self-propelled away from its original normal location—particularly when in the form of a match head. On the other hand, with reduced proportions of lead peroxide—say 5-15%; a much less mobile action and a longer enduring after-glow is attained. It is accordingly within the scope of my invention, where desired, to employ one ratio A of zirconium to lead peroxide (or other oxygen supplier) in direct contact with the primary heat producing element (electrically heated bridge-wire spark gap, percussion cap and the like) and another ratio B of zirconium to oxygen supplier positioned to be ignited by A and to kindle the fuel charge. Further, it is contemplated to use any desired number of ratios as C, D, etc., in addition to A and B, to be successively ignited one from the other and eventually effect ignition of the fuel charge.

It is to be understood that I may employ a variety of methods and designs of assembly; not only of the fuel cartridge and the position of the igniting medium or media thereof, but also of the igniting media themselves, in which are employed my novel type of fuel kindling element. I may, for example, apply my invention to a shot-gun shell type of fuel cartridge or to any other cartridge of suitable design, with or without a confining envelope about the propellent fuel charge, as suggested in my co-pending application Ser. No. 647,268.

Further, I do not limit myself to any type of substantially solid propellent fuel, used in cartridges embodying my invention, but I prefer the use of low residue forming fuels comprising colloided nitrocellulose as an essential ingredient. I also prefer to use a relatively non-quenchable propellent fuel such as is described in the co-pending application Ser. No. 633,215, filed September 14, 1932, Pressure generating propulsive charges for prime movers. By a "substantially solid fuel" I mean one that, in its final form as used, has the appearance of being solid, whereas it may actually contain liquid ingredients as residual solvents, nitroglycerine, oily DNT, etc. Taken as a whole, the composition of my cartridge, including the main fuel charge of nitrocellulose pellets or substituted material and the igniting medium, is substantially ash-free. This is of importance where dealing with parts which must be moved over and over again and which must be kept lubricated.

In accordance with my invention, I accordingly employ a fuel kindling material of such nature and in such small amount that its pressure development is appreciably less than that of conventional kindling materials for fire-arms and cannon. I develop slowly a non-violent but hot and enduring flame, which means that I ignite the main fuel charge slowly and locally. The hot and enduring flame of the kindling element of the present invention offers an important "follow-up" to the original ignition, so that there is added assurance that the main fuel charge will not be extinguished, even though my original ignition is slow, local and non-violent. Further the use of fuel charge substantially free of ash is of great importance in the effective lubrication of the parts.

It is apparent that my invention is not restricted to any particular cartridge form, but broadly covers an ignition device and main fuel combination in any form of association in any desired container, the ignition device being characterized by the preceding description and the main fuel by adaptation of grain size, web, ease and rapidity of ignition, rapidity of burning, amount and difficulty of extinguishing of the main fuel in the operation of prime-movers of the character described. Examples may be given as follows, but they are merely illustrative and not limiting:

(1) Assume a condition where the prime-mover assembly must be light in weight and consequently not strong, yet easily operated. I use an ignition element of enduring flame development which is markedly non-violent, but very hot, such as a 90–10% mixture of zirconium and lead peroxide, with limited confinement by a film, as of nitrocellulose, and a main fuel of limited amount and of slow burning characteristics as influenced by size, number of perforations and chemical composition. I would fire the cartridge into a relatively large shock absorbing space.

(2) Assume a condition where the weight and size of the prime-mover assembly is immaterial, yet operation is not difficult. I might use conditions quite as under Example 1, to minimize wear and tear and expense as a generally proper situation, except that I might reduce the shock absorbing space.

(3) Assume a condition regarding weight and size as in Example 2, but difficult operation. I may make my ignition element of speedier action, somewhat more violent and with duration of flame somewhat subsidiary to the other items, if necessary, as it seems to be, to augment the other factors. For these purposes, I may use an 80–20% mixture of zirconium and lead peroxide in conjunction with powder grains of smaller size and in larger amount, with increased burning surfaces. I would decrease the shock absorbing space.

(4) Assume a condition of the same weight and size of prime-mover and with the same size of shock absorbing space as in Example 1, but with greater difficulty of operation (more power required). I would use an ignition element as in Example 1 associated with a larger amount of a slower burning fuel, as larger sized grains, fewer grain perforations, etc. I would also employ such a fuel, where it is requisite that the pressure exerted upon the movable element be fairly constant and sustained throughout its stroke.

Having described my invention, what I claim is:

1. A propulsive type prime-mover actuating cartridge comprising in combination, a substantially solid self-combustive propellent-type deflagrating main fuel of such nature that its rate of burning increases with increase in pressure, and a deflagrating non-shock producing fuel kindling element comprising zirconium and an oxygen supplier compound as admixed ingredients in such proportions and amount as to be capable of directly igniting the said main fuel while developing gaseous products so gradually and in such small amount as not to materially increase the rate of pressure development of the said main fuel in a closed prime-mover system.

2. A prime-mover actuating cartridge as in claim 1 wherein the said fuel kindling element is substantially chlorine free.

3. A prime-mover actuating cartridge as in claim 1 wherein the said main fuel charge comprises colloided nitrocellulose.

4. A prime-mover actuating cartridge as in claim 1 wherein the said main fuel charge comprises a multiplicity of relatively slow burning colloided nitrocellulose pellets.

5. A propulsive prime-mover actuating cartridge comprising in combination, a substantially solid self-combustive propellent-type deflagrating main fuel charge of such nature that its rate of burning increases with increase of pressure, a primary igniter, and adapted to be ignited by the said primary igniter an intermediate deflagrating non-shock producing fuel kindling element comprising zirconium in admixture with an oxygen supplier compound and in such proportions and amount as to be capable of directly igniting the said main fuel while developing gaseous products so gradually and in such small amount as not to materially increase the rate of pressure development of the said main fuel in a closed prime-mover system.

6. A prime-mover actuating cartridge as in claim 5 wherein the said primary igniter comprises an electrically heated bridge wire.

7. A prime-mover actuating cartridge as in claim 5 wherein the said primary igniter consists of an electrically heated bridge wire.

8. A prime-mover actuating cartridge as in claim 5 wherein the said primary igniter consists of a percussion cap.

9. A prime-mover actuating cartridge as in claim 5 wherein the said primary igniter and said fuel kindling element are embodied in a preformed electric fuse head.

10. A cartridge comprising a shell, a main body of granular fuel therein comprising colloided nitrocellulose, an electric match comprising a primary heat product element and a body of deflagrating non-shock producing fuel kindling composition comprising zirconium and at least one oxygen supplier compound as admixed ingredients in such proportions and amount as to be capable of directly igniting the main fuel and associated with the cartridge and with said main body of fuel.

11. A cartridge comprising a shell, a main body of granular fuel therein comprising colloided nitrocellulose, a primary heat producing element, and a body of deflagrating, non-shock producing fuel kindling composition adapted to be ignited by the said primary heat producing element and to ignite the said main fuel; said fuel kindling composition comprising zirconium and an oxygen supplier compound as admixed ingredients in such proportions and amount as to be capable of directly igniting the main fuel and associated with the cartridge and with said main body of fuel.

12. A cartridge as in claim 11 wherein the said oxygen supplier compound is selected from the group consisting of lead peroxide, lead chromate, barium nitrate and lead nitrate.

13. A cartridge as in claim 11 wherein the said fuel kindling composition comprises 65% to 95% zirconium and 5% to 35% of an oxygen supplier compound selected from the group consisting of lead peroxide, lead chromate, barium nitrate and lead nitrate.

14. A cartridge as in claim 11 wherein the said oxygen supplier compound consists of lead peroxide and the ratio of lead peroxide to zirconium in the said fuel kindling composition ranges from 5:95 to 25:75.

15. A cartridge comprising a shell, a main body of granular fuel therein comprising colloided nitrocellulose, a primary heat producing element, and a body of deflagrating, non-shock producing fuel kindling composition adapted to be ignited by the said primary heat producing element and to ignite the said main fuel; said fuel kindling composition comprising lead peroxide and zirconium powder mixture and a combustible binding agent in such proportions and amount as to be capable of directly igniting the main fuel and associated with the cartridge and with said main body of fuel.

16. A cartridge as in claim 15 wherein the ratio of lead peroxide to zirconium in the said fuel kindling composition ranges from 5:95 to 25:75.

17. A cartridge comprising a shell, a main body of granular fuel therein comprising colloided nitrocellulose, an electrically heated bridge wire and an intermediate body of fuel kindling composition positioned to be ignited directly by the said bridge wire and to ignite the said main fuel; said fuel kindling composition comprising zirconium and an oxygen supplier compound as admixed ingredients in such proportions and amount as to be capable of directly igniting the said main fuel.

18. An electric match comprising a primary igniter having positioned thereon a deflagrating, non-shock producing, kindling composition comprising an admixture of zirconium and oxygen supplier compound in such proportions and amount as to be capable of igniting substantially solid, self-combustive propellent type fuel such as colloided nitrocellulose, the ratio of zirconium to oxygen supplier compound in that portion of the kindling composition directly adjacent the primary igniter being such as to take ignition therefrom and less than the ratio of zirconium to oxygen supplier compound in the remainder of the kindling composition.

CARL D. PRATT.

CERTIFICATE OF CORRECTION.

Patent No. 2,309,978.

February 2, 1943.

CARL D. PRATT.

It is hereby certified that error appears in the printed specification of the above numbered patent requiring correction as follows: Page 6, first column, lines 35 and 36, claim 11, and second column, lines 16 and 17, claim 15, strike out the words "and associated with the cartridge and with said main body of fuel"; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.

CERTIFICATE OF CORRECTION.

Patent No. 2,309,978. February 2, 1943.

CARL D. PRATT.

It is hereby certified that error appears in the printed specification of the above numbered patent requiring correction as follows: Page 6, first column, lines 35 and 36, claim 11, and second column, lines 16 and 17, claim 15, strike out the words "and associated with the cartridge and with said main body of fuel"; and that the said Letters Patent should be read with this correction therein that the same may conform to the record of the case in the Patent Office.

Signed and sealed this 6th day of April, A. D. 1943.

Henry Van Arsdale,
(Seal) Acting Commissioner of Patents.